May 14, 1963  J. J. DOMICONE  3,089,799
LAMINATED GLASS ARTICLES AND METHOD OF MAKING SAME
Filed Jan. 22, 1960

INVENTOR.
JOSEPH J. DOMICONE
BY
Clarence R. Patty Jr.
ATTORNEY

3,089,799
LAMINATED GLASS ARTICLES AND METHOD OF MAKING SAME

Joseph J. Domicone, Elmira, N.Y., assignor to Corning Glass Works, Corning, N.Y., a corporation of New York
Filed Jan. 22, 1960, Ser. No. 4,088
10 Claims. (Cl. 154—2.7)

This invention relates to heat-resistant, laminated glass articles and is especially concerned with a laminated glass windshield or other closure for aircraft.

It is well known to laminate sheet glass members with an organic plastic interlayer or laminant in producing so-called safety glass, vehicle windshields. Numerous plastic laminants have been proposed and several have provided quite satisfactory service at normal atmospheric temperatures. These organic plastic materials are generally incapable of withstanding elevated temperatures, and tend to deteriorate rapidly when employed as laminants under such conditions.

Current developments in the aircraft industry present increasingly higher thermal-resistance requirements for laminated windshields and similar closures. Present requirements of 400–500° F. are beyond the capabilities of conventional laminating materials, and anticipated requirements of 800–900° F. exceed the limitations of even thermal-resistant organic materials such as silicones. It is therefore a primary purpose of this invention to provide novel glass laminants, and articles embodying such laminants, that are capable of providing such thermal resistance, in conjunction with the conventional properties of transparency, adherence, flexibility and the like.

The invention resides in a laminated glass article comprising a fused transparent silver salt as the laminant. Suitable silver salts include the sulfate, bromide and chloride, the latter being generally preferred as a laminating material.

Figure 1:
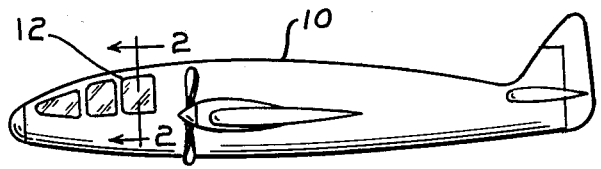
Figure 2:
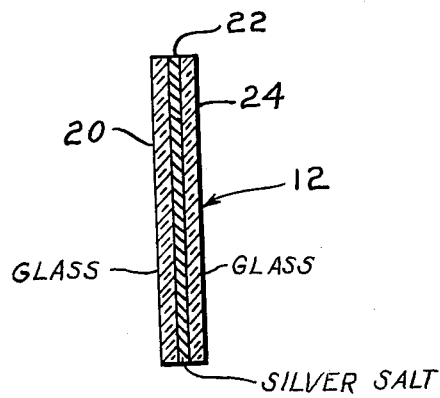

The invention is further described with reference to the accompanying drawing in which, FIG. 1 is a side elevation of an aircraft illustrating a windshield as a specific embodiment of the invention, and FIG. 2 is an enlarged section along 2—2 of FIG. 1.

FIG. 1 shows a typical aircraft 10 having as a forward windshield or closure member, a laminated glass window 12 mounted or affixed in the aircraft 10 in any conventional manner. As shown in FIG. 2, window 12 is composed of matching glass sheets 20 and 24, joined or sealed together with a thin interlayer 22 of a fused silver salt laminant.

In producing laminated window 12, glass sheets 20 and 24 are thoroughly cleaned and dried as by acid washing and/or baking at an elevated temperature, e.g. 500° C. A thin layer of finely divided laminant is applied over the laminating surface of one of the glass sheets, referred to for convenience as the base sheet. This may, for example, be accomplished by sifting the silver salt laminant through a 40-mesh screen to provide a uniformly distributed layer on the flat glass surface. The second, or cover, sheet of glass is then placed over the silver salt and the assembly placed in a heating chamber. In order to avoid slippage of the glass sheets with respect to each other during fusion, the assembly may be mounted in any convenient jig arrangement. The assembly is brought to an elevated temperature at which the laminating salt fuses to form a liquid interlayer completely wetting the laminating surfaces of the opposed glass sheets. The laminating temperature is preferably about 40–50° C. above the melting point of the silver salt laminant.

Alternatively, the base and cover glass sheets and the laminating salt may be heated to the laminating temperature separately. The molten laminating salt is then poured or cast over the base glass member and the cover glass placed over the molten laminant and aligned with the base glass member. Where the weight of cover glass is inadequate, additional pressure may be applied to the assembly for proper sealing.

I have found that the indicated silver salts, unlike other metal salts either individually or in combinations, do not become brittle on cooling. Rather, they tend to form a transparent, flexible interlayer which has properties similar to previously used organic laminants, except for the superior heat-resistance. The silver salt laminants of the invention are adapted to use at temperatures up to 900° F. without deterioration.

Because of its relatively high melting point, 642° C., silver sulphate, as well as the glass on which it is applied, must be heated to at least 700° C. This is above the deformation temperature of softer glasses. It also tends to result in staining of the glass surface by ion interchange if the high temperature must be maintained an appreciable length of time. Silver bromide is generally satisfactory except for a slight greenish tint which may prove objectionable for some purposes. Silver chloride is, therefore, generally preferred because of its colorless nature and ability to be handled at around 500° C. In general, other silver salts tend to produce either a colored or an opaque brittle laminant which is undesirable.

There is, however, a tendency for these laminants to darken and separate from the glass on exposure to ultraviolet light. This tendency is particularly pronounced in the case of silver chloride. In attempting to counteract the darkening tendency by means of minor amounts of additives, it was found that the darkening tendency apparently results from trace amounts of copper present in the silver salt as an impurity. In view of this finding it is desirable to avoid the presence of copper or copper salt impurities in a silver salt laminant.

Where this degree of purity is not feasible, anhydrous nickel chloride may be incorporated in the laminant in trace amounts to suppress the darkening tendencies. However, extreme care must be taken to minimize the amount of nickel chloride additive since as little as 0.1% may cause embrittlement and opacity of the entire laminating layer during cooling of the laminated article. It is desirable, therefore, that the amount of nickel chloride additive correspond approximately to the amount of copper impurity and not exceed about 0.1% in any event.

It is well known that silver and alkali ions may exchange at a glass surface and produce a yellow or amber silver stain in the glass. In order to avoid the possibility of such staining during the laminating process, it is preferable to employ alkali-free glass bodies for laminating purposes.

While the invention has been described with particular reference to aircraft closures, it will be appreciated that numerous modifications are contemplated within the scope of the appended claims. In particular, the invention is adapted to production of other types of thermally-resistant laminated glass articles such as furnace-viewing glasses.

What is claimed is:

1. A laminated glass article comprising spaced glass layers and a fused, transparent silver salt, selected from the group consisting of silver sulfate, silver bromide, and silver chloride, as the laminating interlayer for the glass layers.

2. The article of claim 1 in which the salt is silver chloride.

3. An aircraft closure comprising spaced glass sheets and a fused transparent silver salt, selected from the group consisting of silver sulfate, silver bromide, and silver chloride as the laminating interlayer for the glass sheets.

4. A closure in accordance with claim 3 in which the salt is silver chloride.

5. A closure in accordance with claim 4 in which the silver chloride is free of copper.

6. A closure in accordance with claim 4 in which the silver chloride contains a minute amount of nickel chloride not exceeding about 0.1%.

7. A closure in accordance with claim 3 in which the glass sheets are formed from an alkali-free glass.

8. A method of producing a thermally-resistant, laminated glass article which comprises joining spaced glass surfaces by forming a fused, transparent layer of a silver salt intermediate and adherent to the spaced glass surfaces, the silver salt being selected from the group consisting of silver sulfate, silver bromide and silver chloride.

9. The method of claim 8 wherein the silver salt is applied intermediate the glass surfaces as a finely divided powder and fused in situ.

10. The method of claim 8 wherein the silver salt is fused and cast as a molten layer on a glass laminating surface and a second glass laminating surface is placed over the molten layer of silver salt.

References Cited in the file of this patent

UNITED STATES PATENTS

| | | |
|---|---|---|
| 595,485 | Lamb | Dec. 14, 1897 |
| 2,676,117 | Colbert et al. | Apr. 20, 1954 |
| 2,918,757 | France et al. | Dec. 29, 1959 |
| 2,963,823 | Ohliger | Dec. 13, 1960 |